US006707575B1

(12) United States Patent  (10) Patent No.: US 6,707,575 B1
Akiyama  (45) Date of Patent: Mar. 16, 2004

(54) RESOLUTION HEIGHTENING CIRCUIT FOR HEIGHTENING RESOLUTION OF ELECTROPHOTOGRAPHIC PRINTER

(75) Inventor: Minoru Akiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/435,636

(22) Filed: Nov. 8, 1999

(30) Foreign Application Priority Data

Nov. 6, 1998 (JP) .......................................... 10/315698

(51) Int. Cl.[7] .............................................. G06R 15/00
(52) U.S. Cl. ........................................ 358/1.9; 358/1.2
(58) Field of Search ........................... 358/1.9, 1.2, 1.7, 358/451; 382/299

(56) References Cited

U.S. PATENT DOCUMENTS 5,841,464 A  * 11/1998  Phillips ....................... 347/253

FOREIGN PATENT DOCUMENTS

| JP | 4-336859 | 11/1992 | ............ H04N/1/23 |
| JP | 5-4381 | 1/1993 | ............ B41J/2/44 |
| JP | 5-500443 | 1/1993 | ............ H04N/1/23 |
| JP | 5-131674 | 5/1993 | ............ G06K/15/00 |
| JP | 5-260300 | 10/1993 | ............ H04N/1/40 |
| JP | 8-20137 | 1/1996 | ............ G06J/3/40 |
| JP | 8-185021 | 7/1996 | ............ G03G/15/043 |
| JP | 2673958 | 7/1997 | ............ H04N/1/113 |
| JP | 10-171219 | 6/1998 | ............ G03G/15/043 |
| JP | 10181067 | * 7/1998 | ............ B41J/2/36 |

* cited by examiner

Primary Examiner—Jerome Grant, II
(74) Attorney, Agent, or Firm—McGinn & Gibb, PLLC

(57) ABSTRACT

A resolution heightening circuit comprises a modulation information generating circuit that receives printing data supplied from a host printer control circuit to generate a pulse width modulation information signal on the basis of the printing data. The modulation information generating circuit uses a reference template of four lines by three dots to increase the number of dots for a line at a printing unit. A modulation circuit is connected to the modulation information generating circuit and the printing unit and produces modulated driving pulses in response to the pulse width modulation information signal to supply the modulated driving pulses to the printing unit.

20 Claims, 16 Drawing Sheets

— CENTER OF GRAVITY

— CENTER OF GRAVITY

RESOLUTION HEIGHTENING CIRCUIT FOR HEIGHTENING RESOLUTION OF ELECTROPHOTOGRAPHIC PRINTER

BACKGROUND OF THE INVENTION

This invention relates to a resolution heightening circuit, particularly, relates to a resolution heightening circuit which is used in an electrophotographic printer to apparently heighten resolution of the electrophotographic printer.

An electrophotographic printer has a printing unit including a driving circuit. In general, performance of the printing unit decides resolution of the electrophotographic printer. That is, resolution of the printing unit is equal to the resolution of the electrophotographic printer.

The performance of the printing unit is represented by the maximum number of lateral printing lines that can be printed on a paper having a predetermined size and the maximum number of printing dots that can be printed on each of the lateral printing lines having a predetermined length. In other wards, the performance of the printing unit is represented by the maximum numbers of dots, which the printing unit can print along longitudinal and lateral directions, per inch.

If the performance of the printing unit is elevated, the resolution of the electrophotographic printer will be heightened. Such a technique is disclosed in each of Japanese Unexamined Patent Publication No. 8-185021, Japanese Unexamined Patent Publication No. 10-171219, and Japanese patent No. 2673958.

However, elevation of the printing unit's performance is expensive because it needs high precision in control for the driving circuit.

So some proposals are made to apparently heighten resolution of the electrophotographic printer without improvement of the driving circuit.

For example, Japanese Unexamined Patent Publication No. 4-336859 discloses a high density image forming method. In the high density image forming method, a laser beam is irradiated and scanned on a surface of a photosensitive element of a printing unit to form beam dots each of which partially overlaps adjacent beam dots. Strength of the laser beam is changed to form a latent image pattern on the surface of the photosensitive element. Namely, the strength of the laser beam is adjusted so that some beam dots individually form latent image dots and the other beam dots forms latent image dots at overlapped areas of the beam dots. Thus, the high density image forming method obtains seeming heightened resolution.

However, the high density image forming method provides disappointing result because it doesn't adopt a pulse width modulation technique and can not represent gradation. In addition, the high density image forming method has a fault that it is difficult to control the strength of the laser beam.

Another method for heightening resolution of the electrophotographic printer is disclosed in Japanese Unexamined Patent Publication No. 5-500433. The method apparently doubles resolution of a printing unit by using a reference template and image data signal, which corresponds to double the resolution of the printing unit.

However, the method brings the same result from certain different patterns of the reference template because the reference template has a size of two lateral lines by four dots (i.e. 8 pixels). That is, the method doesn't always apparently double the resolution of the printing unit.

Moreover, the method needs a large memory to memorize a large number of modulation information which correspond to all patterns of the reference template.

SUMMARY OF THE INVENTION

It is therefore an object of this invention to provide a resolution heightening circuit that can apparently heighten resolution of a printing unit.

It is another object of this invention to provide a resolution heightening circuit that drives a printing unit with simple control.

It is still another object of this invention to provide a resolution heightening circuit that makes a printing unit faithfully print in response to input data.

It is further still another object of this invention to provide a resolution heightening circuit that is a small-scale circuit.

Other object of this invention will become clear as the description proceeds.

On describing the gist of this invention, it is possible to understand that a resolution heightening circuit is connected between a printing unit, which has a first resolution, and a host printer control circuit, which produces printing data for a second resolution grater than the first resolution. The resolution heightening circuit produces modulated driving pulses on the basis of the printing data and supplies the modulated driving pulses to the printing unit to apparently heighten resolution of the printing unit.

According to the gist of this invention, the resolution heightening circuit comprises a modulation information generating circuit that is connected to the host printer control circuit and that generates a pulse width modulation information signal on the basis of the printing data to increase the number of dots for a line at the printing unit. A modulation circuit is connected to the modulation information generating circuit and the printing unit and produces the modulated driving pulses in response to the pulse width modulation information signal to supply the modulated driving pulses to the printing unit.

In the resolution heightening circuit, the modulation information generating circuit comprises a line data memorizing circuit that is connected to the host printer control circuit to memory the printing data. A template pattern producing circuit is connected to the line data memorizing circuit and reads out the printing data from the line data memorizing circuit to produce template patterns of four lines by three dots on the basis of the printing data. A modulation information forming circuit is connected to the template pattern producing circuit and the modulation circuit and forms the pulse width modulation information signal from the template patterns to supply the pulse width modulation information signal to the modulation circuit.

Moreover, the modulation information forming circuit comprises first, second, and third processing circuits that are connected to the template pattern producing circuit and processes left, middle, and right columns of each of the template patterns to produce first, second, and third processed value signals, respectively. A pulse width deciding circuit is connected to the second processing circuit and decides width of the driving pulses on the basis of the second processed value signal to produce a width signal representative of the width. A pulse position deciding circuit is connected to the first and the second processing circuits and decides position of the driving pulses on the basis of the first and the third processed value signal to produce a position signal representative of the position. A pulse width modulation information producing circuit is connected to both the pulse width deciding circuit and the pulse position deciding circuit and produces the pulse width modulation information signal in response to the width signal and the position signal.

In addition, the pulse width deciding circuit comprises a plurality of pulse width setting registers that registers pulse width setting data sets different from one another, respectively. A first selector is connected to the pulse width setting registers and the second processing circuit and selects one from the pule width setting registers in response to the second processed value signal to supply the pulse width setting data set registered in selected one of the pulse width setting registers to the pulse width modulation information producing circuit as the width signal. The pulse position deciding circuit comprises a subtracting circuit that is connected to the first and the third processing circuits to subtract a value represented by the third processed value signal form a value represented by the first processed value signal to produce a subtracted result signal. A plurality of pulse position setting registers register pulse position setting data sets different from one another, respectively. A second selector is connected to the subtracting circuit and the pulse position setting registers and selects one of the pulse position setting register in response to the subtracted result signal to supply the pulse position setting data set registered in selected one of said pulse position setting registers to the pulse width modulation information producing circuit as the position signal.

DESCRIPTION OF THE PREFERRED EMBODIMENT

Figure 1:
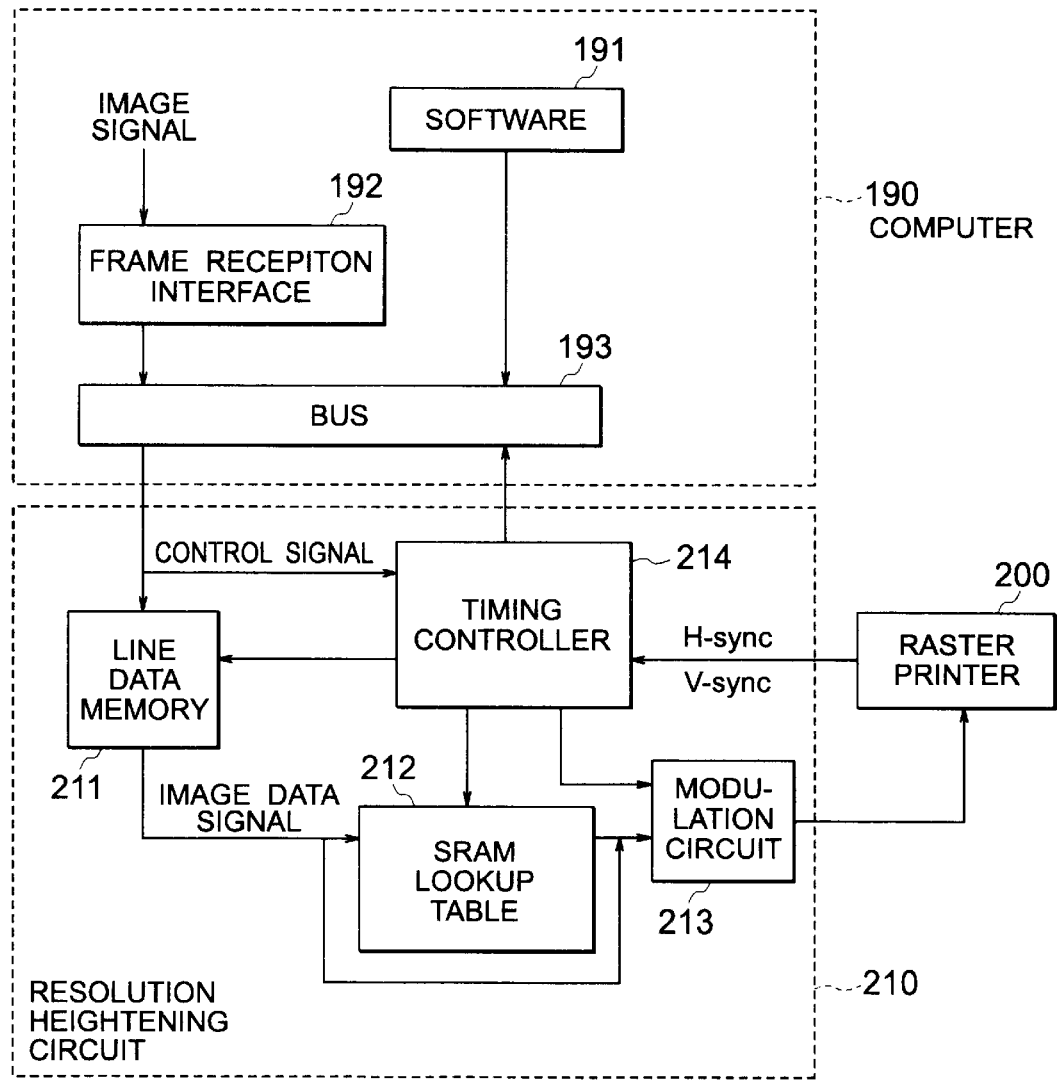
FIG. 1 is a block diagram of a conventional resolution heightening circuit.

Referring to FIG. 1, description will be at first directed to a conventional resolution heightening circuit for a better understanding of this invention. The conventional resolution heightening circuit is disclosed in Japanese Unexamined Patent Publication No. 5-500433.

In FIG. 1, the conventional resolution heightening circuit 210 is connected between a computer 190 and a raster printer 200.

The computer 190 comprises software 191 for driving the raster printer 200, a frame reception interface 192 for receiving image signal, and a bus 193 for connecting the software 191 and the frame reception interface 192 to the resolution heightening circuit 210.

The resolution heightening circuit 210 comprises a line data memory 211 that memorizes the image signal supplied from the computer 190. An SRAM (Static Random Access Memory) lookup table 212 uses patterns of a reference template as addresses. A modulation circuit 213 produces a modulating signal in response to an output signal of the lookup table 212. A timing controller 214 controls operation timing of every parts in response to synchronizing signals (H-sync and V-sync) supplied from the raster printer 200 and a control signal supplied from the computer 190.

The image signal corresponds to double the resolution of the raster printer 200 and is divided into a plurality of data sets to form the patterns (or template patterns) in the resolution heightening circuit 210. The reference template has a size of two lateral lines by four dots. In other wards, the reference template has eight pixels (2×4 pixels). The template patterns are used as addresses to retrieve modulation information sets from the SRAM lookup table 212, respectively.

The modulation information sets are used for producing a modulation signal in the modulation circuit 213. Each of the modulation information sets includes at least two data corresponding to each template patterns. One represents darkness (or tone) of the template pattern while the other represents a position of the center of gravity of the template pattern.

Figure 2:
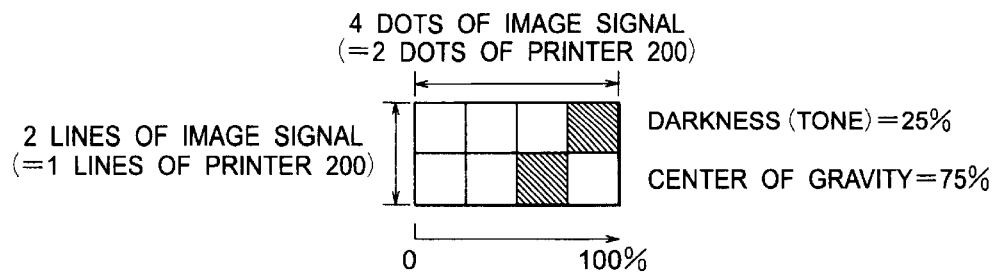
FIG. 2 shows an example of a template pattern used in the conventional resolution heightening circuit of FIG. 1.

The darkness is represented by the percentage of black pixels in the pattern of the reference template. For example, the pattern shown in FIG. 2 has the darkness of 25% (black pixels/all pixels=2/8=0.25). On the other hand, the position of the center of gravity is decided by positions of the black pixels in the template pattern. That is, the position of the center of gravity is represented by the percentage of distance from left end of the template pattern when black pixels have the same weight and white pixels have no weight. For example, the position of the center of gravity of the template pattern shown in FIG. 2 is represented by 75% ((3.5/4+2.5/4)/2=0.75).

Figure 3:
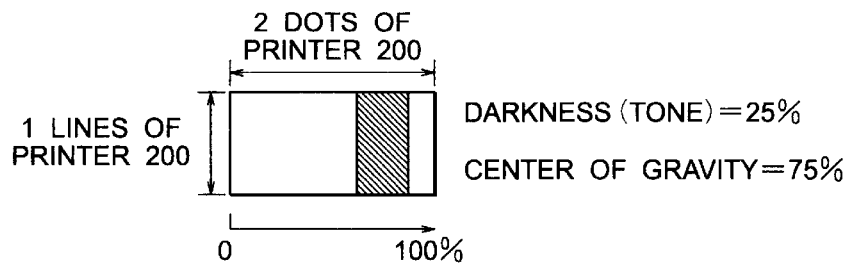
FIG. 3 shows an example of a printing pattern according to the template pattern of FIG. 2.

The modulation circuit 213 produces the modulation signal in response to the modulation information sets read out from the SRAM lookup table 212. In other wards, the modulation circuit 213 modulates width of driving pulses, which supplies to the raster printer 200, in response to the modulation information sets. The raster printer 200 carries out printing in response to the modulation signal. If the modulation information set represents 25% of the darkness and 75% of the position of the center of the gravity, the printing pattern is as shown in FIG. 3.

To correspond to all of the template patterns, it is necessary that the SRAM lookup table 212 memorizes modulating information sets corresponding to all of the template patterns.

Thus, the conventional resolution heightening circuit apparently doubles the resolution of the raster printer 200.

Figure 4:
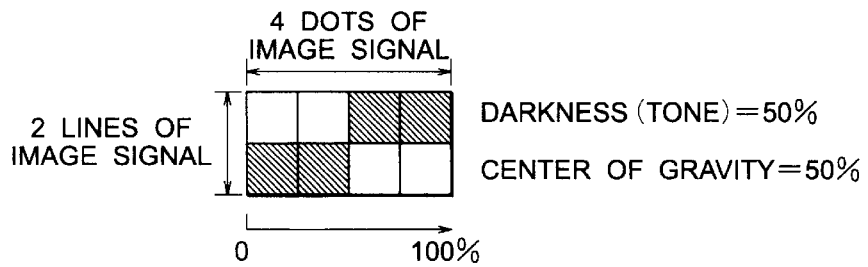
FIG. 4 shows another example of the template pattern used in the conventional resolution heightening circuit of FIG. 1.
Figure 5:
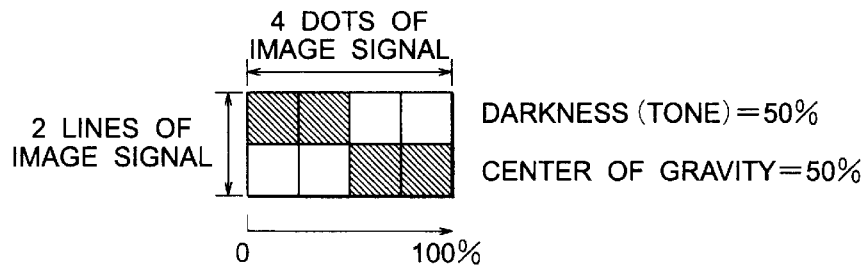
FIG. 5 shows still another example of the template pattern used in the conventional resolution heightening circuit of FIG. 1.

By the way, the template pattern shown in FIG. 4 has darkness of 50% and a position of the center of gravity of 75%. On the other hand, the template pattern shown in FIG. 5 has darkness of 50% and a position of the center of gravity of 75%. That is, these template patterns shown in FIGS. 4 and 5 have the same darkness and the same position of the center of gravity. Therefore, these template patterns bring the same printed result. That is, the resolution heightening circuit can not always double the resolution of the raster printer 200.

In addition, the resolution heightening circuit has a problem that it needs large memory for the SRAM lookup table 212 because the modulation information sets are $2^8$.

Referring to FIGS. 6 through 23, the description will proceed to a resolution heightening circuit according to a preferred embodiment of this invention.

Figure 6:
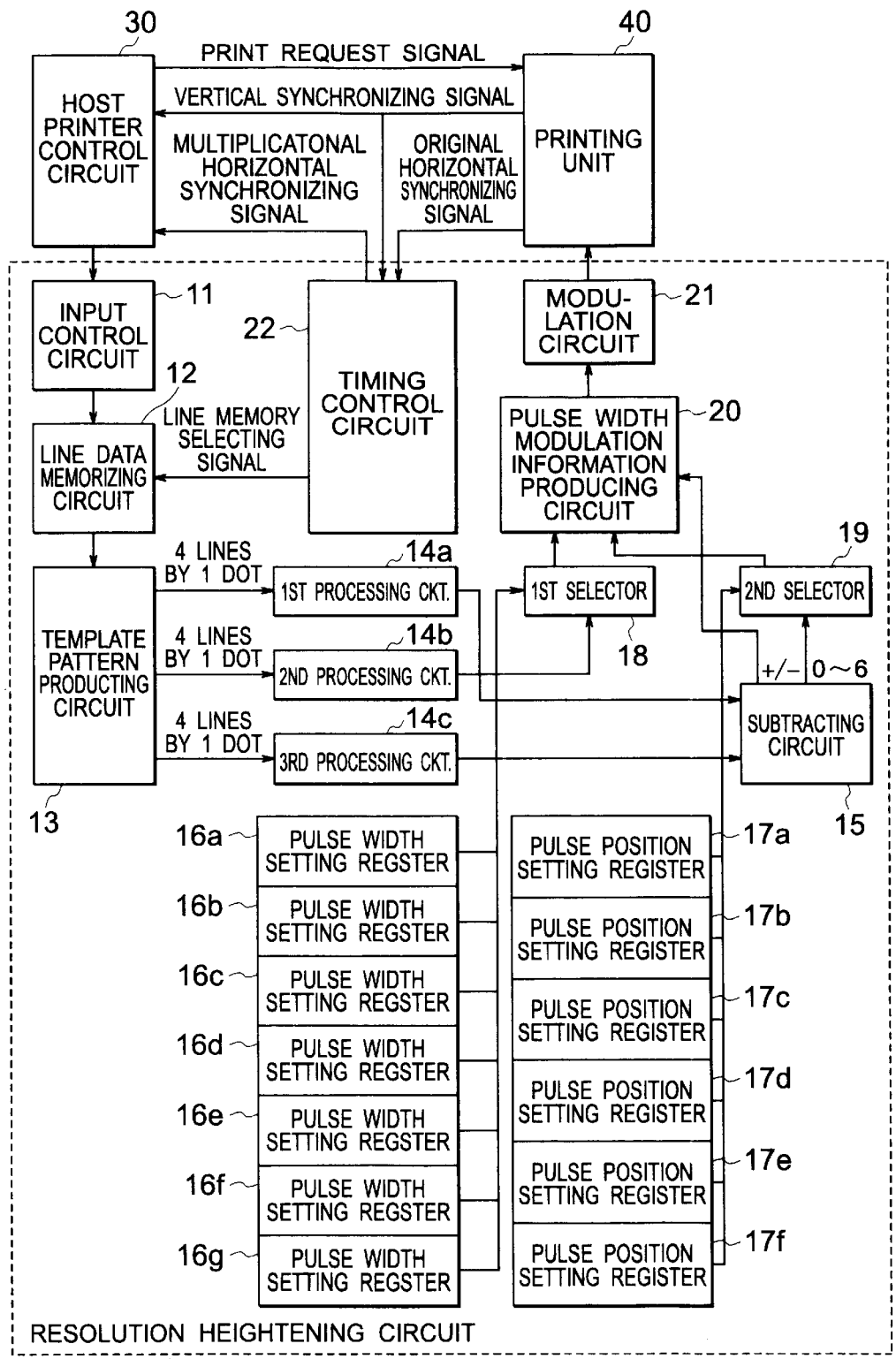
FIG. 6 is a block diagram of a resolution heightening circuit according to a preferred embodiment of this invention.

In FIG. 6, a resolution heightening circuit 10 is connected to a host printer control circuit 30 and a printing unit 40 to form an electrophotographic printer.

The resolution heightening circuit 10 comprises an input control circuit 11 to receive input printing data which are comprising a plurality of line data sets and are supplied from the host printer control circuit 30. A line data memorizing circuit 12 is connected to the input control circuit 11 and includes six FIFO (first-in first-out) line memories. A template pattern producing circuit 13 is connected to the line data memorizing circuit 12 to produce template patterns of four lateral lines by three dots from the input printing data memorized in the line data memorizing circuit 12. The template pattern producing circuit 13 divides each of the template patterns into left, middle, and right columns. Each of the columns has four lines by one dot.

First, second and third processing circuits 14a, 14b and 14c are connected to the template pattern producing circuit 13. The first processing circuit 14a processes the left column of each template pattern to produce a first processed value signal representative of a first processed value. The second processing circuit 14b processes the middle column of each template pattern to produce a second processed value signal representative of a second processed value. The third processing circuit 14c processes the right column of each template pattern to produce a third processed value signal representative of a third processed value.

A subtracting circuit 15 is connected to the first and the third processing circuits 14a and 14c and subtracts the third processed result from the first processed result to produce an absolute value signal representative of an absolute value of difference between the third processed result and the first processed result and a sign signal showing that the difference is a positive number or a negative number.

Pulse width setting registers 16a to 16g register pulse width setting data sets that are different from one another. Pulse position setting registers 17a to 17f register pulse position data sets that are different from one another. A first selector 18 is connected to the second processing circuit 14b and the pulse width setting registers 16a to 16g and selects one of the pulse width setting registers 16a to 16g in response to the second processed value signal. The first selector 18 reads out the pulse width setting data set from the selected one of the pulse width setting registers 16a to 16g. A second selector 19 is connected to the subtracting circuit 15 and the pulse position setting register 17a to 17f and selects one of the pulse position setting register 17a to 17f in response to the absolution value signal. The second selector 19 reads out one of the pulse position setting data sets from the selected one of the pulse position setting register 17a to 17f.

A pulse width modulation information producing circuit 20 is connected to the subtracting circuit 15, the first selector 18 and the second selector 19 to produce a pulse width modulation information signal in response to the sign signal supplied from the subtracting circuit 15, the pulse width setting data set supplied from the first selector 18, and the pulse position setting data set supplied from the second selector 19. A modulation circuit 21 is connected to the pulse width modulation information producing circuit 20 and the printing unit 40 and produces modulated driving pulses. The modulated driving pulses are supplied to the printing unit 40.

A timing control circuit 22 is connected to the printing unit 40 and receives vertical synchronizing signal and (original) horizontal synchronizing signal supplied from the printing unit 40 to control operation timing of each circuit in the resolution heightening circuit 10. The timing control circuit 22 is also connected to the host printer control circuit 30 and produces a multiplicational horizontal synchronizing signal in response to the original horizontal synchronizing signal.

All circuits 11 through 22 except for the modulation circuit 21 form a modulation information generating circuit. Especially, a combination of the processing circuit 14a–14c, the subtracting circuit 15, the pulse width setting registers 16a–16g, the pulse position setting registers 17a–17f, the first and the second selectors 18, 19, and the pulse width modulation information producing circuit 20 is called a modulation information forming circuit. The pulse width setting registers 16a–16g and the first selector 18 form a pulse width deciding circuit. The subtracting circuit 15, the pulse position setting register 17a–17f and the second selector 19 form a pulse position deciding circuit.

Figure 7:
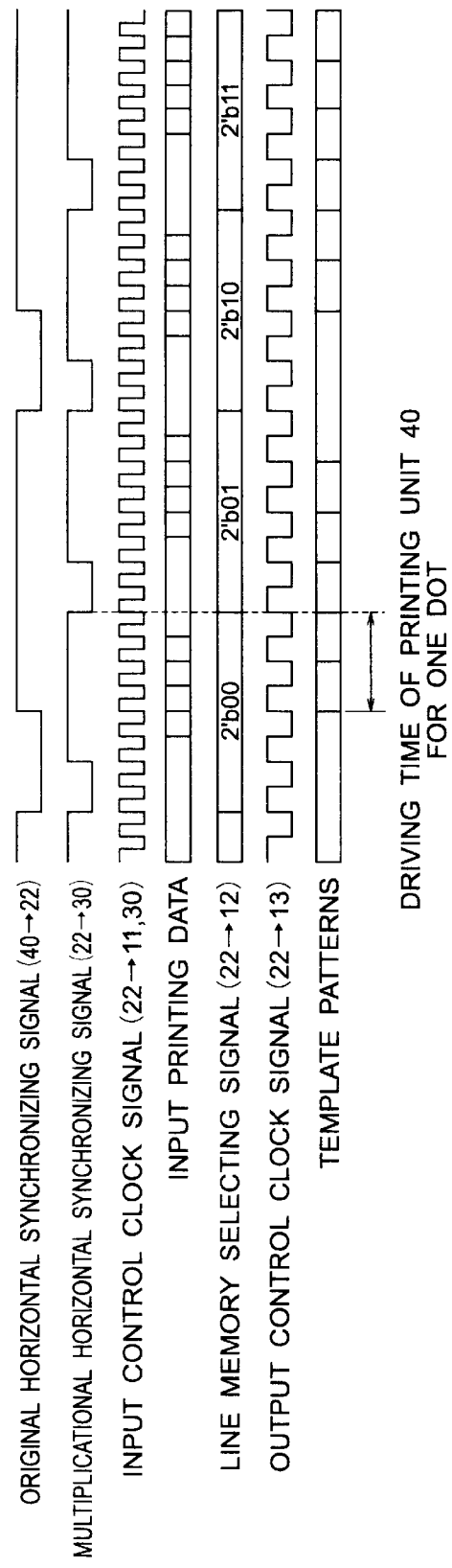
FIG. 7 is a time chart for describing an operation of the resolution heightening circuit of FIG. 6.

Referring to FIG. 7 together with FIG. 6, description will be made about operation of the resolution heightening circuit 10 in the following.

At first, the host printer control circuit 30 supplies a print request signal to the printing unit 40. The printing unit 40 produces the vertical and the original horizontal synchronizing signal. The vertical synchronizing signal is supplied to both the timing control circuit 22 and the host printer control circuit 30. The original horizontal synchronizing signal is supplied to the timing control circuit 22.

The timing control circuit 22 receives the original horizontal synchronizing signal supplied from the printing unit 40 and produces the multiplicational horizontal synchronizing signal, which has double the pulse frequency of the original horizontal synchronizing signal. The multiplicational horizontal synchronizing signal is supplied to the host printer control circuit 30. Moreover, the timing control circuit 22 produces an input control clock signal and supplies it to both of the host printer control circuit 30 and the input control circuit 11. The input control clock signal has a period that is equal to a quarter of a driving time of the printing unit 40 for one dot. Herein, a relationship between the multiplicational horizontal synchronizing signal and the input control clock signal shown in FIG. 7 is merely an example. The control clock signal really has much higher pulse repetition frequency than 8 bits per a period of the multiplicational horizontal synchronizing signal. In addition, the timing control circuit 22 produce a line memory selecting signal which synchronize with the multiplicational horizontal synchronizing signal and is supplied to the line data memorizing circuit 12. Furthermore, the timing control circuit 22 produces an output control clock signal which has a period equal to a half of the driving time of the printing unit 40 for one dot and which is supplied to the template pattern producing circuit 13.

The host printer control circuit 30 supplies the input printing data to the input control circuit 11 in response to the multiplicational synchronizing signal and the input control clock signal. Herein, the input printing data correspond to double the resolution of the printing unit 40. If the printing unit 40 has the resolution of N (N: a natural number) lines by M (N: a natural number) dots, the input printing data correspond to resolution of 2N lines by 2M dots. That is, the input printing data have the amount which is four times as large as that corresponding to the printing unit 40. In other wards, the input printing data of two lines by two dots matches one dot in the printing unit 40. Accordingly, during the printing unit 40 processes data for one line, the resolution heightening circuit 10 receives the input printing data for two lines.

The input control circuit 11 receives the input printing data and supplies them to the line data memorizing circuit 12. In this time, the input control circuit 11 detects first black data representative of a first black pixel and supplies a black data detection signal representative of detection of the first black data to the timing control circuit 22. The operation about the detection of the first black data will be explained after in more detail with referring to FIG. 22 and 23.

Figure 8:
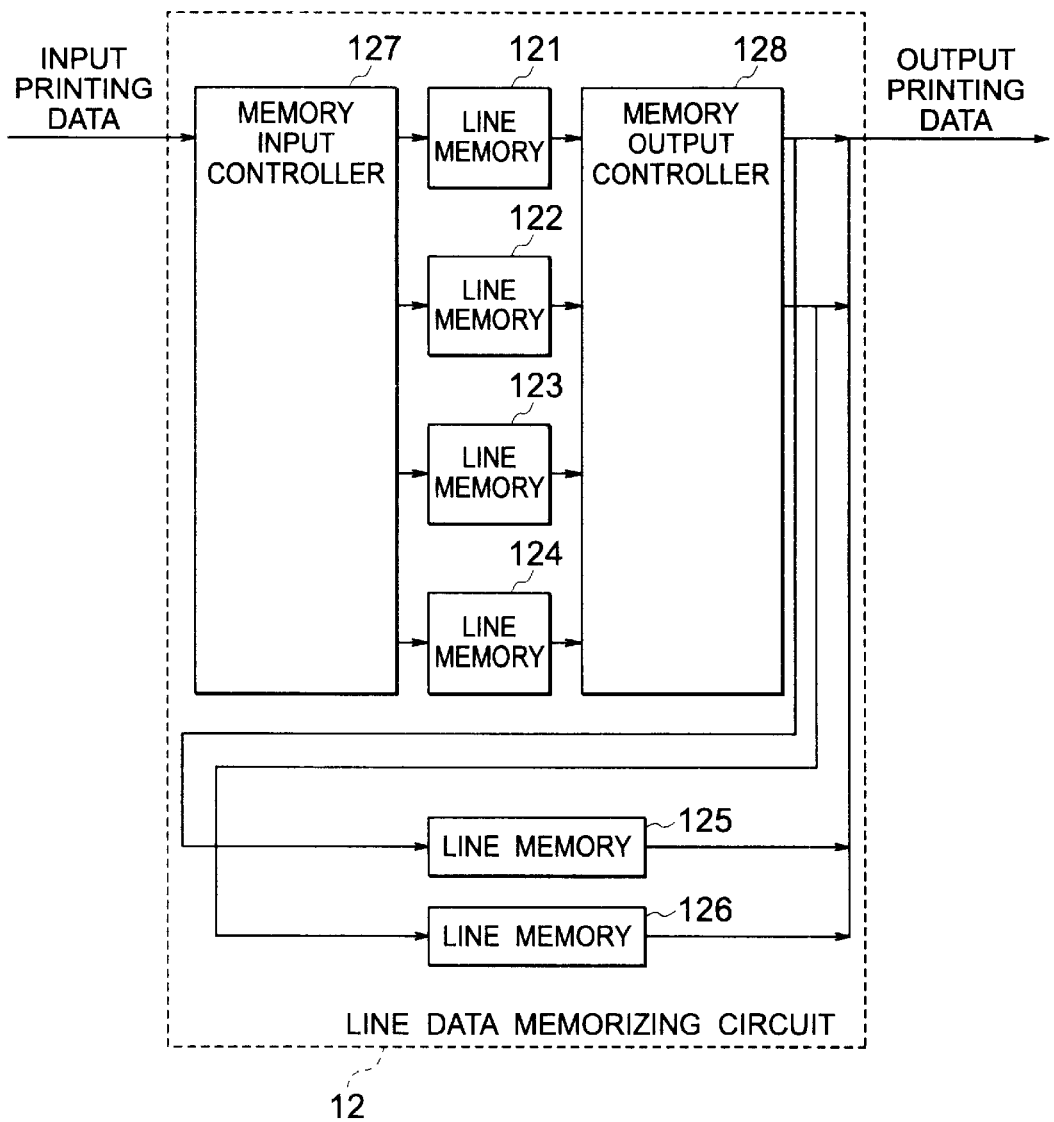
FIG. 8 is a block diagram of a line data memorizing circuit included in the resolution heightening circuit of FIG. 6.

The line data memorizing circuit 12 has, for example, a structure as shown in FIG. 8. That is, the line data memorizing circuit 12 comprises the six line memories 121 to 126, a memory input controller 127, and a memory output controller 128.

With this structure, the memory input controller 127 receives the line memory selecting signal from the timing control circuit 22 and selects one of the line memories 121 to 124 in response to the line memory selecting signal to write the input printing data therein. The line memory selecting signal periodically designates the line memories 121 to 124 in turn. The selection and the writing are carried out for each line data set. The memory output controller 128 periodically selectively reads out two of the line data sets memorized in the line memories 121 to 124 on the basis of the line memory selecting signal to supply them to the line memories 125 and 126 and the template pattern producing circuit 13. The line memories 125 and 126 memorize the line data sets read out by the memory output controller 128. The line data memorizing circuit 12 supplies the line data sets read out from the 125 and 126 to the template pattern producing circuit 13 together with the line data sets read out by the memory output controller 128 as read out printing data.

Referring to FIGS. 9A to 9D, the operation of the line data memorizing circuit 12 is described in more detail. Herein, it is assumed that the line memory selecting signal changes as shown in FIG. 7. That is the line memory selecting signal periodically represents "2'b00", "2'b01", "2'b10", and "2'b11" in order. The "2'b00", the "2'b01", the "2'b10", and the "2'b11" designate the line memories 121, 122, 123, and 124, respectively.

Figure 9A:
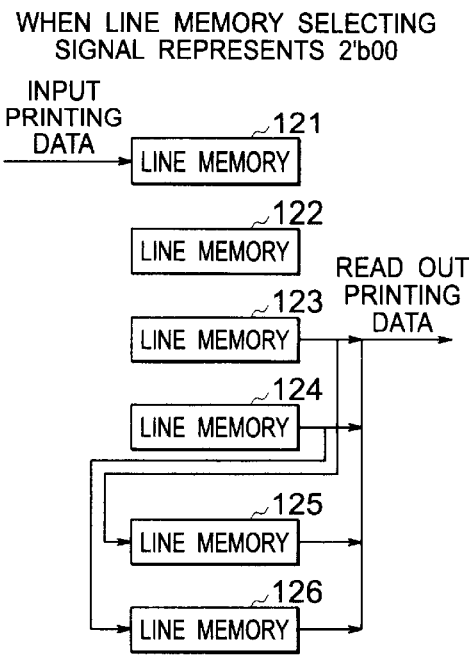
FIGS. 9A–9d are for describing an operation of the line data memorizing circuit of FIG. 8.

When the line memory selecting signal periodically represents "2'b00", the line data memorizing circuit 12 operates as illustrated in FIG. 9A. That is, the memory input controller 127 writes the input printing data for one line data set into the line memory 121 while the memory output controller 128 read out two line data sets memorized in the line memories 123 and 124. The line memories 125 and 126 memorize the line data sets read out by the memory output controller 128 and output other two line data sets memorized in them. The line data memorizing circuit 12 supplies the read out printing data for four line data sets read out from the line memories 123, 124, 125, and 126 to the template pattern producing circuit.

Figure 9B:
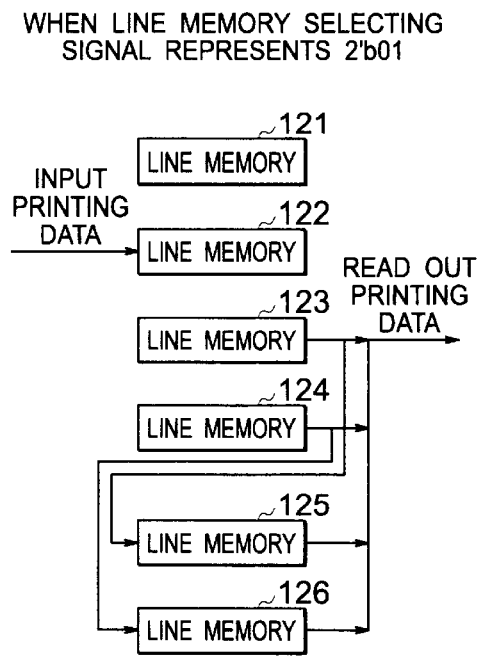

When the line memory selecting signal periodically represents "2'b01", the line data memorizing circuit 12 operates as illustrated in FIG. 9B. That is, the memory input controller 127 writes the input printing data for one line data set into the line memory 122 while the memory output controller 128 read out two line data sets memorized in the line memories 123 and 124. The line memories 125 and 126 memorize the line data sets read out by the memory output controller 128 and output other two line data sets memorized in them. The line data memorizing circuit 12 supplies the read out printing data for four line data sets read out from the line memories 123, 124, 125, and 126 to the template pattern producing circuit 13.

Figure 9C:
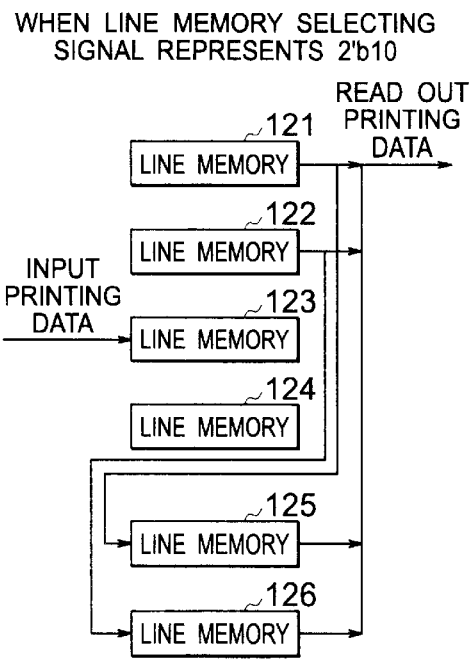

When the line memory selecting signal periodically represents "2'b10", the line data memorizing circuit 12 operates as illustrated in FIG. 9C. That is, the memory input controller 127 writes the input printing data for one line data set into the line memory 123 while the memory output controller 128 read out two line data sets memorized in the line memories 121 and 122. The line memories 125 and 126 memorize the line data sets read out by the memory output controller 128 and output other two line data sets memorized in them. The line data memorizing circuit 12 supplies the read out printing data for four line data sets read out from the line memories 121, 122, 125, and 126 to the template pattern producing circuit 13.

Figure 9D:
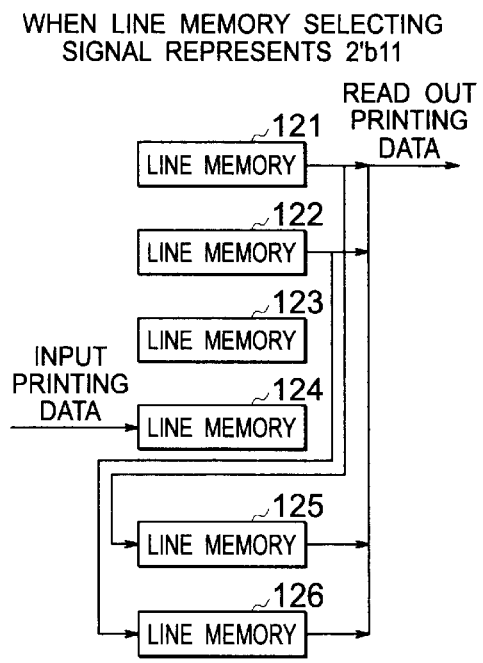

When the line memory selecting signal periodically represents "2'b11", the line data memorizing circuit 12 operates as illustrated in FIG. 9D. That is, the memory input controller 127 writes the input printing data for one line data set into the line memory 124 while the memory output controller 128 read out two line data sets memorized in the line memories 121 and 122. The line memories 125 and 126 memorize the line data sets read out by the memory output controller 128 and output other two line data sets memorized in them. The line data memorizing circuit 12 supplies the read out printing data for four line data sets read out from the line memories 121, 122, 125, and 126 to the template pattern producing circuit 13.

Figure 10:
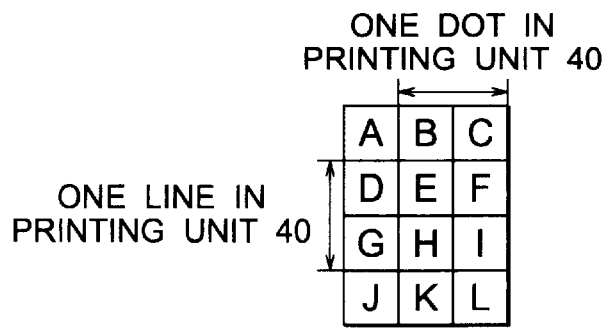
FIG. 10 shows a reference template used in the resolution heightening circuit of FIG. 6.

The template pattern producing circuit 13 has a reference template of four lines by 3 dots as shown in FIG. 10. Two lines and two dots of the reference template correspond to one line and one dot in the printing unit 40, respectively.

The template pattern producing circuit 13 applies the read out printing data to the reference template to produce the template patterns. That is, the read out printing data become contents of the reference template. Each of the contents is representative of a black pixel or a white pixel. To produce the template patterns, the contents of the reference template shift to leftward for one dot when each pulse of the output control clock signal is supplied from the timing control circuit 22 and shift to upward for two lines when each pulse of the vertical synchronizing signal is supplied from the timing control circuit 22.

The template pattern producing circuit 13 divides each template pattern into the left, the middle, and the right columns. The left column has the contents of "A", "D", "G", and "J" of FIG. 10 and is supplied to the first processing circuit 14a. The middle column has the contents of "B", "E", "H", and "K" of FIG. 10 and is supplied to the second processing circuit 14b. The right column has the contents of "C", "F", "I", and "L" of FIG. 10 and is supplied to the third processing circuit 14c.

Figure 11:
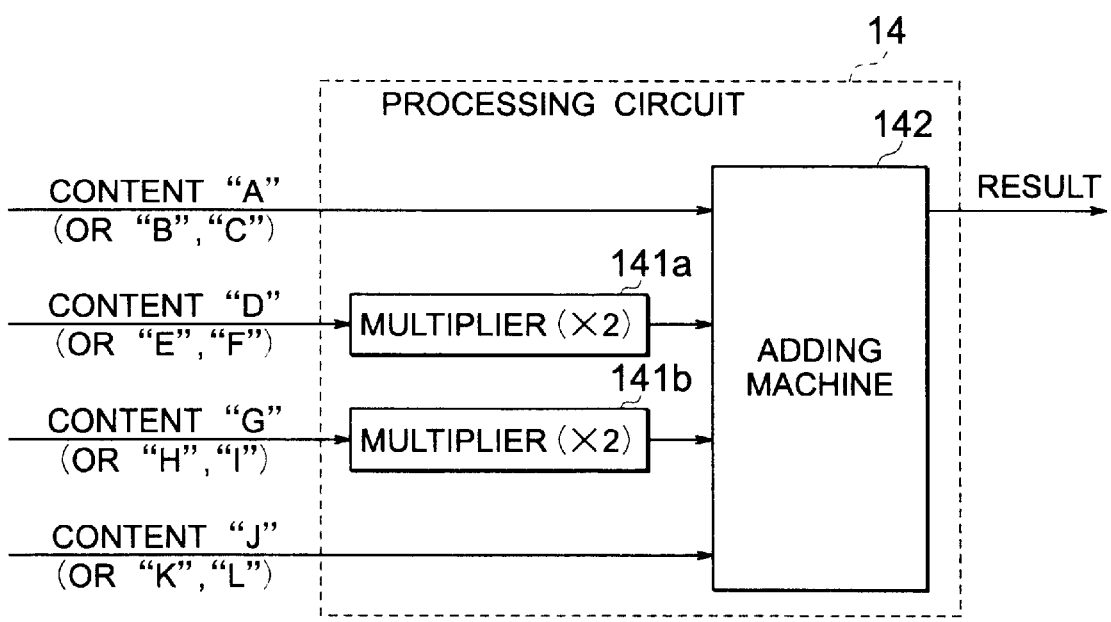
FIG. 11 is a block diagram of a processing circuit included in the resolution heightening circuit of FIG. 6.
Figure 12:
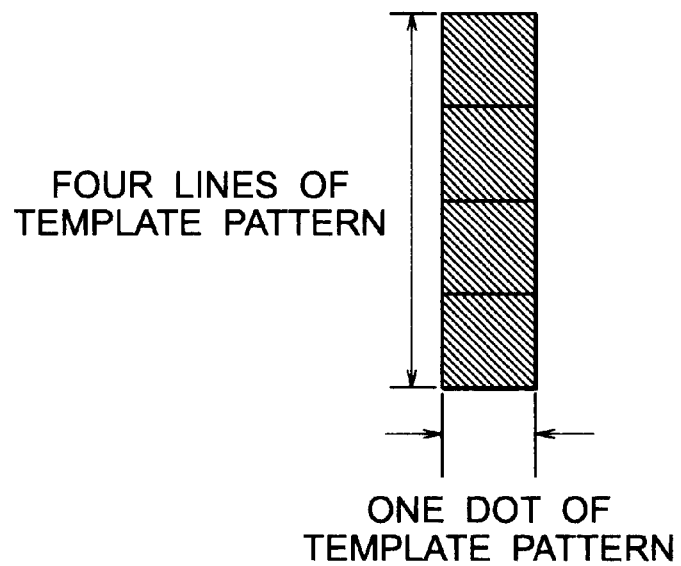
FIG. 12 shows an example of a column of a template pattern used in the resolution heightening circuit of FIG. 6.
Figure 13:
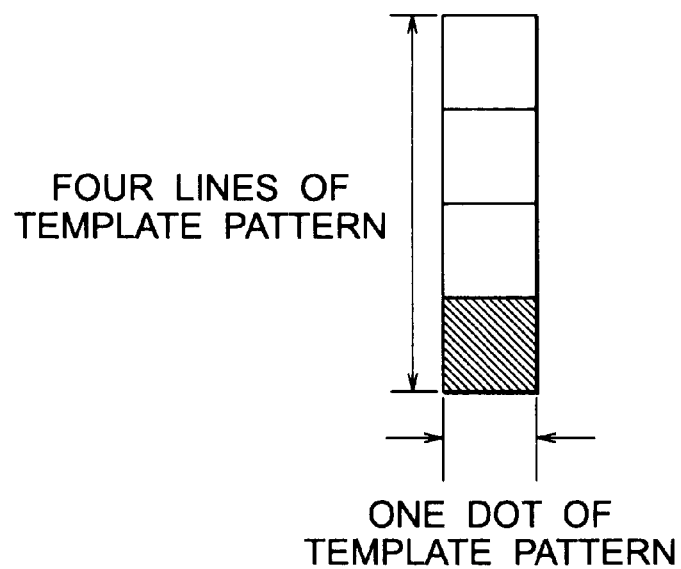
FIG. 13 shows another example of the column of the template pattern used in the resolution heightening circuit of FIG. 6.

Each of the processing circuits 14a, 14b, and 14c is, for example, formed as shown in FIG. 11. That is, the processing circuit 14 comprises two multipliers 141a and 141b and an adding machine 142. The processing circuit 14 regards the black and the white pixels as "1" and "0", respectively. Then, the processing circuit 14 calculates a numeral formula of A+2D+2G+J (or B+2E+2H+K, C+2F+2I+L) and produces the processed value signal representative of a result of the calculation (or the processed value). The result is an integer from "0" to "6". For example, the value signal is representative of "6" when the column illustrated in FIG. 12 is supplied to the processing circuit 14. Moreover, the value signal is representative of "1" when the column illustrated in FIG. 13 is supplied to processing circuit 14. It can be considered that the value signal represents weighted darkness (or weighted tone) of the column.

The middle processing circuit 14b supplies the second processed value signal to the first selector 18 to decide width of the driving pulse for the printing unit 40. On the other hand, the left and the right processing circuit 14a and 14c supply the first and the third processed value signals to the subtracting circuit 15 to decide position of the driving pulse for the printing unit 40.

Under the condition that the driving pulse for the one dot in the printing unit 40 has the width of "1", the pulse width setting registers 16a, 16b, 16c, 16d, 16e, 16f, and 16g register, for example, "0", "1/16", "2/16", "4/16", "5/16", "6/16", and "7/16" as the pulse width setting data sets, respectively. The first selector 18 selects one of the pulse width setting register 16a to 16g in response to the second processed value signal and supplies the pulse width setting data set from the selected pulse width setting register to the pulse width modulation information producing circuit 20.

The subtracting circuit 15 subtracts the third processed value from the first processed value to produce the absolute value signal and the sign signal. The difference between the third processed value and the first processed value is equal to an integer from "−6" to "+6". When the black and the white pixels of the template pattern have weight of "1" and "0", respectively, the difference represents a distance between the central position and the center of gravity of the template pattern. If the difference is a positive number, the center of gravity lies on the left side of the template pattern. On the contrary, the center of gravity lies on the left side of the template when the result is a positive number.

Figure 14A:
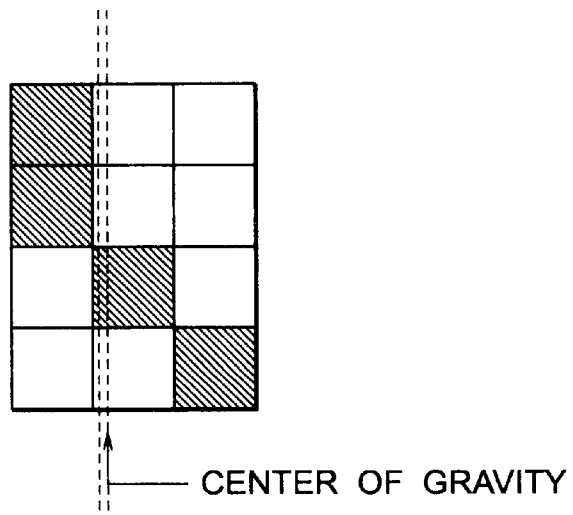
FIGS. 14A–14B show two example of the template pattern used in the resolution heightening circuit of FIG. 6.
Figure 14B:
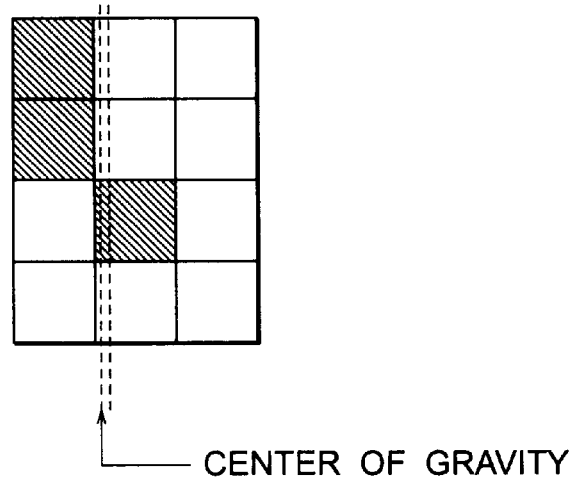

For example, when the template pattern is as shown in FIG. 14A, the difference is "+2" and the center of gravity lies on the left side of the template pattern. When the template pattern is as shown in FIG. 14B, the difference is "+3" and the center of gravity lies on the left side of the template pattern. The distance in the case shown in FIG. 14B is larger than that in the case shown in FIG. 14A.

The subtracting circuit 15 supplies the absolute value signal and the sign signal to the second selector 19 and the pulse width modulation information producing circuit 20, respectively.

The pulse position setting registers 17a to 17f register the pulse position data sets. For example, the pulse position setting registers 17a, 17b, 17c, 17d, 17e, and 17f register "1/16", "2/16", "3/16", "4/16", "5/16", and "6/16", respectively, under the condition that the driving time of the printing unit 40 for one dot is "2".

The second selector 19 selects one of the pulse position setting registers 17a to 17f in response to the absolute value signal. When the absolute value signal represents "1", "2", "3", "4", "5", and "6", the second selector 19 selects the pulse setting registers 17a, 17b, 17c, 17d, 17e, and 17f, respectively. If the absolute value signal represents "0", the second selector 19 does nothing.

Figure 15:
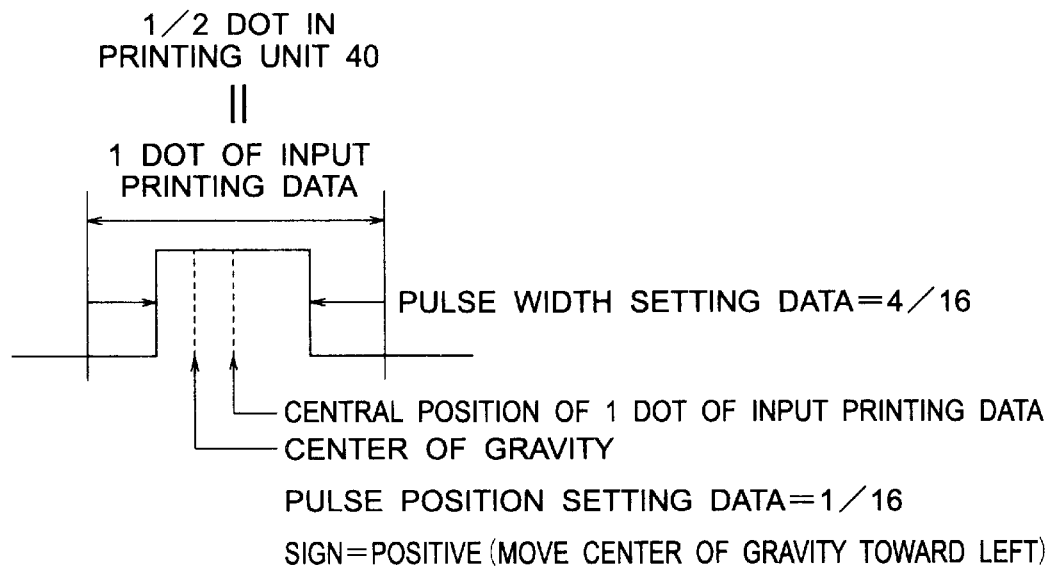
FIG. 15 shows a driving pulse produced by the resolution heightening circuit of FIG. 6.
Figure 16:
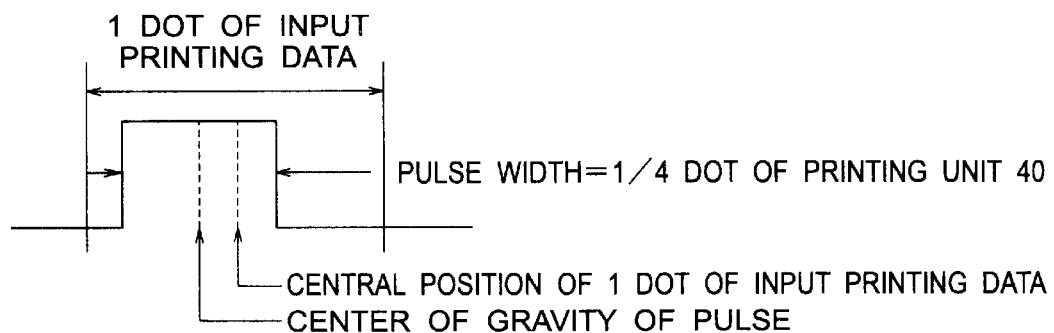
FIG. 16 shows a modulated driving pulse produced by the resolution heightening circuit of FIG. 6.

The pulse width modulation information producing circuit 20 produces the pulse width modulation information signal in response to the sign signal supplied from the subtracting circuit 15, the pulse width setting data set supplied from the first selector 18, and the pulse position setting data set supplied from the second selector 19. For example, when the sign signal, the pulse width setting data set and the pulse position setting data set represent the positive, "4/16", and "1/16", respectively, as illustrated in FIG. 15, the pulse width modulation information signal make the modulation circuit 21 produce a driving pulse as shown in FIG. 16.

The pulse width modulation information signal is supplied to the modulation circuit 21. The modulation circuit 21 produces the modulated driving pulses in response to the pulse width modulation information signal. The modulated driving pulses are supplied to the printing unit 40. The printing unit 40 carries out the printing in response to the modulated driving pulses.

Figure 17A:
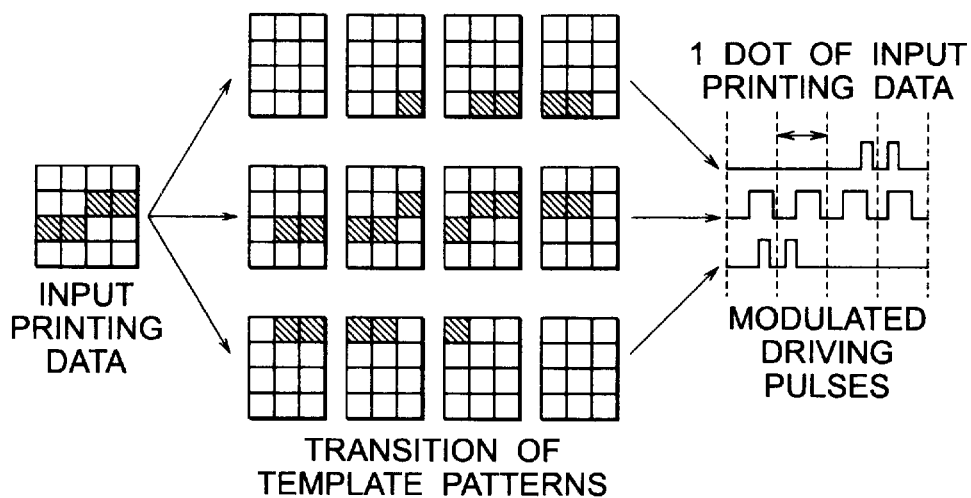
FIGS. 17A–17B are used for describing an operation of the resolution heightening circuit of FIG. 6.
Figure 17B:
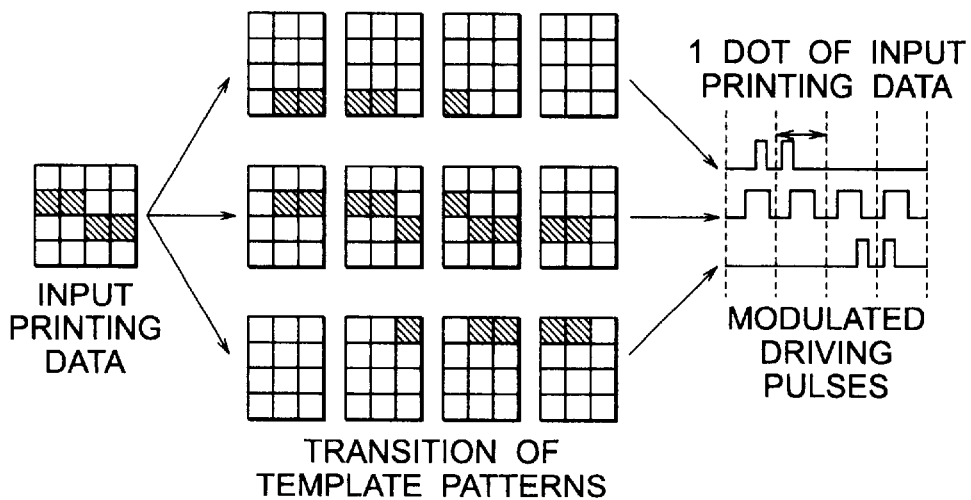

Relationships among the input printing data, template patterns and the modulated driving pulses are illustrated in FIGS. 17A and 17B. The input printing data representing input patterns of FIGS. 17A and 17B corresponds to the template patterns shown in FIGS. 4 and 5. That is, the input patterns can not distinguish from each other by the use of the conventional resolution heightening circuit 210 illustrated in FIG. 1. However, the resolution heightening circuit 10 can distinguish these input patterns from each other. That is, the modulated driving pulses shown in FIG. 17A are quite different from that shown in FIG. 17B. Therefore, the resolution heightening circuit 10 can reproduce a printed result with high precision. This is because each of the template patterns has a size of four lines by three dots and the driving pulses are modulated about their width in the modulation circuit 21.

Moreover, the resolution heightening circuit 10 is smaller than the conventional resolution heightening circuit 210. This is because the resolution heightening circuit 10 has the plus width setting register 16a to 16g and the pulse position setting register 17a to 17f instead of the SRAM lookup table 212.

Figure 18A:
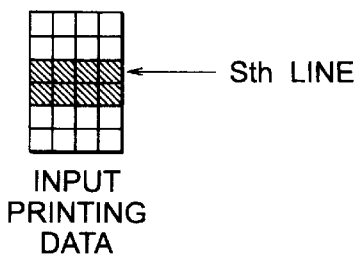
FIGS. 18A–18C are used for describing the operation of the resolution heightening circuit of FIG. 6.

Now, consideration is made about a case where the input printing data represents a pattern illustrated in FIG. 18A.

Figure 18B:
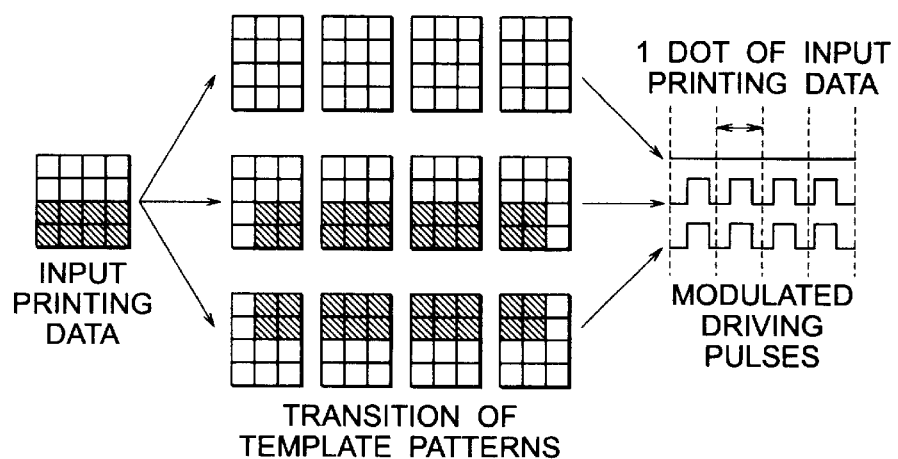
Figure 18C:
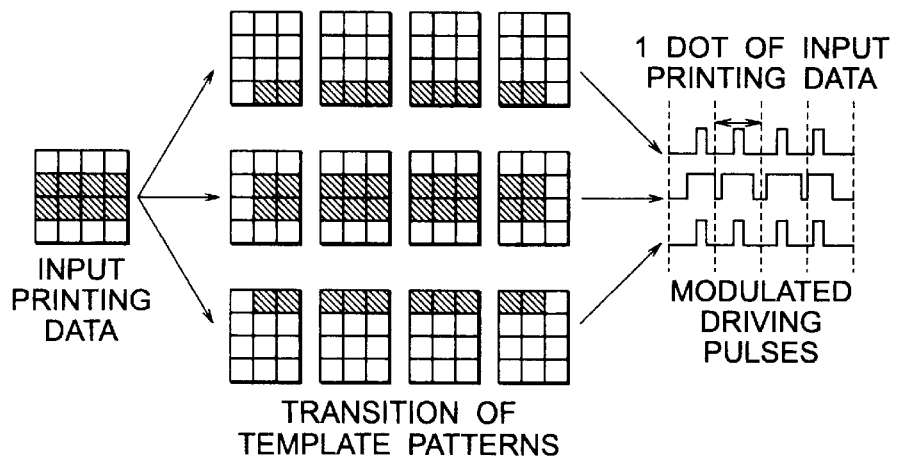

If the Sth line of the input printing data is memorized in the line memory 121 or 123, the template patterns and the modulated driving pulses are as illustrated in FIG. 18B. On the other hand, the template patterns and the modulated driving pulses are as illustrated in FIG. 18C if the Sth line of the input printing data is memorized in the line memory 122 or 124. That is, certain input printing data does not always give the same printed result.

Then, to obtain the same printed result about the same input printing data, it is necessary to fix relationship between an output timing of the input printing data from the host printer control circuit 30 and the line memory selecting signal produced by the timing control circuit 22.

Figure 19:
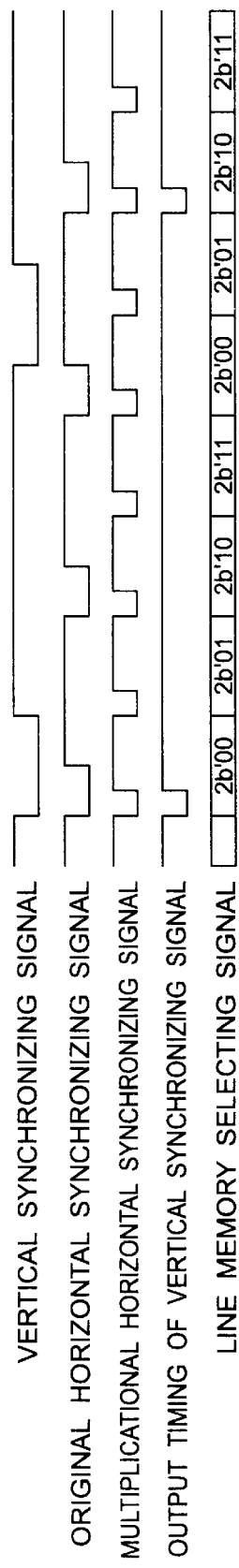
FIG. 19 is a time chart for describing the operation of the resolution heightening circuit of FIG. 6.
Figure 20:
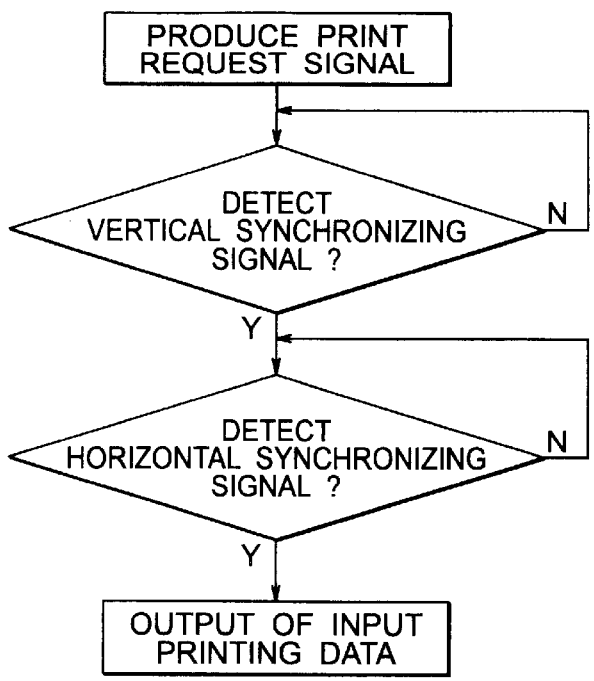
FIG. 20 is a flow chart for describing an operation of a host printer control circuit shown in FIG. 6.
Figure 21:
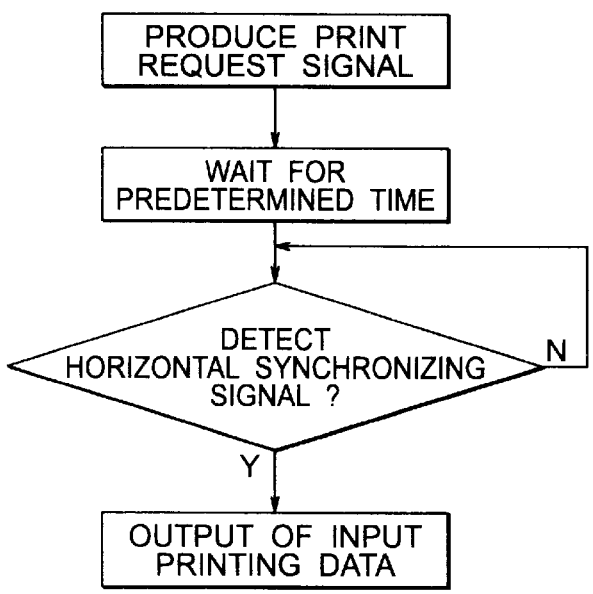
FIG. 21 is a flow chart for describing another operation of the host printer control circuit shown in FIG. 6.

If the printing unit 40 outputs the vertical synchronizing signal so as to be synchronized with the original horizontal synchronizing signal as shown in FIG. 19, the relationship between the output timing of the input printing data and the line memory selecting signal may be fixed. Actually, this method causes the same printed result about the same input printing data when the host printer control circuit 30 operates as illustrated in FIG. 20. However, the method as mentioned above is ineffectual when the host printer control circuit 30 operates as illustrated in FIG. 21.

Therefore, the resolution heightening circuit 10 detects the first black data of the input printing data at the input control circuit 11 to memorize the first black data into the specific one of the line memories 121 to 124. In consequence, the resolution heightening circuit 10 produces the same modulated driving pulses from the same input printing data.

Figure 22:
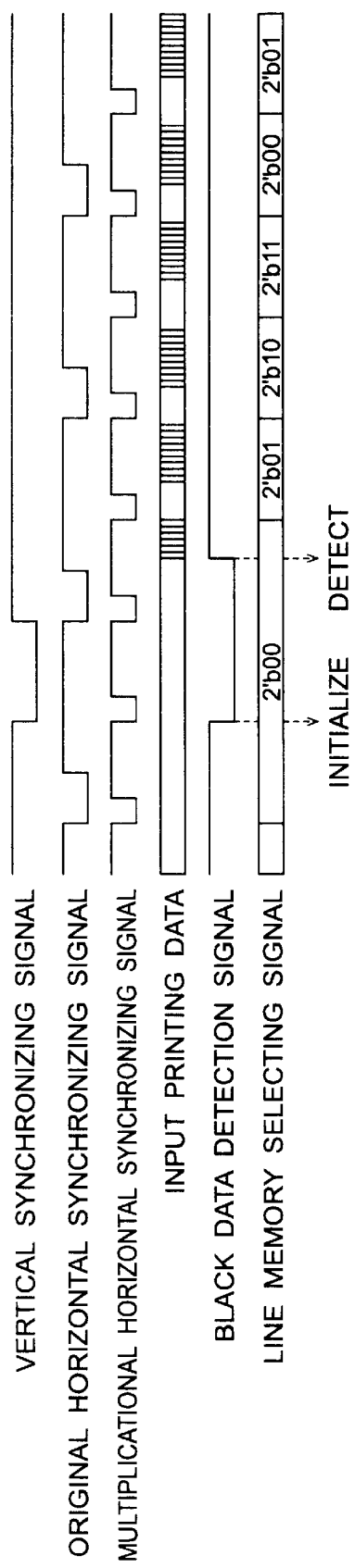
FIG. 22 is a time chart for describing the operation of the resolution heightening circuit of FIG. 6.
Figure 23:
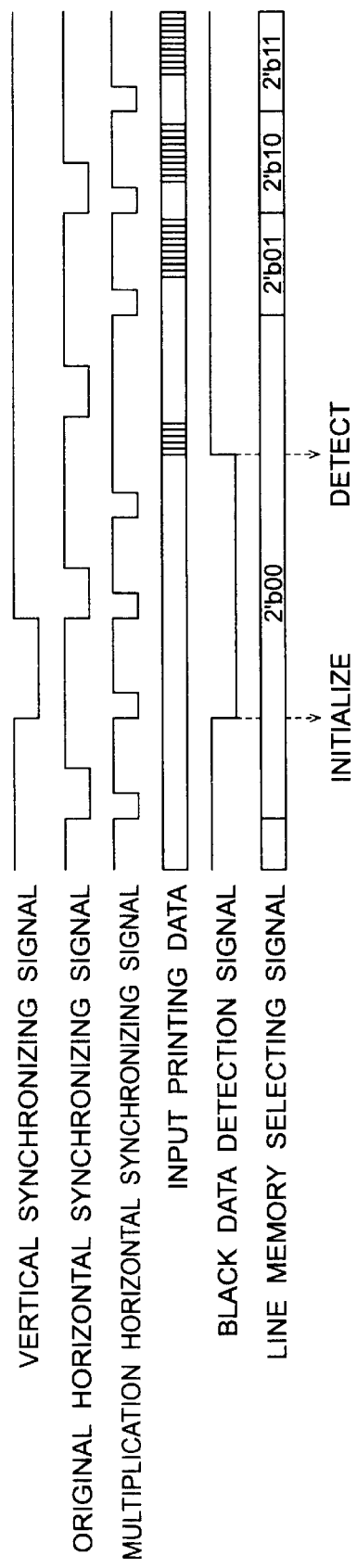
FIG. 23 is a time chart for describing the operation of the resolution heightening circuit of FIG. 6.

Referring to FIGS. 22 and 23, the operation for memorizing the first black data in the specific line memory will be described soon.

The timing control circuit 22 starts the operation when the vertical synchronizing signal or the original horizontal synchronizing signal. In this event, the timing control circuit 22 supplies an initializing signal to a black data detecting circuit (not shown) included in the input control circuit 11 and repeats production of the line memory selecting signal representative of "2'b00" as shown in FIG. 22 (or 23).

The black data detecting circuit is initialized by the initializing signal at the next pulse timing of the multiplicational horizontal synchronizing signal. Then, the block data detecting circuit detects the first black data of the input printing data supplied to the input control circuit11 and supplies the black data detection signal to the timing control circuit 22.

In a case where the black data detection signal is received by the timing control circuit 22 after the reception of a certain pulse of the original horizontal synchronizing signal and before the next timing of the pulse production for the multiplication horizontal synchronizing signal as illustrated in FIG. 22, the timing control circuit 22 starts changing the line memory selecting signal in synchronism with the multiplication horizontal synchronizing signal at the next timing of the pulse production of the multiplication horizontal synchronizing signal. On the other hand, in a case where the black data detection signal is received by the timing control circuit 22 after the reception of a certain pulse of the original horizontal synchronizing signal and after the next timing of the pulse production for the multiplication horizontal synchronizing signal as illustrated in FIG. 23, the timing control circuit 22 stop producing the pulse of the multiplication horizontal synchronizing signal at the next timing of the pulse production for the multiplication horizontal synchronizing signal. Then, the timing control circuit 22 starts changing the line memory selecting signal in synchronism with the multiplication horizontal synchronizing signal at the timing of the pulse production for the multiplication horizontal synchronizing signal after next as shown in FIG. 23.

Thus, in the resolution heightening circuit 10, the first black data is always memorized in the specific line memory of the lime data memorizing circuit 12. Accordingly, the same printing result about the same input printing data is obtained by the use of the resolution heightening circuit 10.

While this invention has thus for been described in conjunction with the preferred embodiment thereof, it will readily be possible for those skilled in the art to put this invention into practice in various other manners. For example, the pulse width setting data sets and registers 16 may be over or under seven. Moreover, the pulse position setting data sets may be over or under eleven and the pulse position setting register 17 may be over or under six.

What is claimed is:

1. A resolution heightening circuit connected between a printing unit, which has a first resolution, and a host printer control circuit, which produces printing data for a second resolution greater than the first resolution, for producing modulated driving pulses on the basis of the printing data and for supplying the modulated driving pulses on the basis of the printing data and for supplying the modulated driving pulses to said printing unit to apparently heighten the resolution of said printing unit, said resolution heightening circuit comprising:

a modulation information generating circuit connected to said host printer control circuit for generating a pulse width modulation information signal on the basis of the printing data to increase the number of dots for a line at the printing unit, wherein said modulation information generating circuit uses a template pattern of four lines by three dots; and a modulation circuit connected to said modulation information generating circuit and said printing unit for producing the modulated driving pulses in response to the pulse width modulation information signal to supply the modulated driving pulses to the printing unit.

2. A resolution heightening circuit as claimed in claim 1, wherein said modulation information generating circuit comprises:

a line data memorizing circuit connected to the host printer control circuit for memorizing the printing data;

a template pattern producing circuit connected to said line data memorizing circuit for reading out the printing data from said line data memorizing circuit to produce said template pattern on the bases of the printing data; and a modulation information forming circuit connected to said template pattern producing circuit and said modulation circuit for forming the pulse width modulation information signal from the template pattern to supply the pulse width modulation information signal to said modulation circuit.

3. A resolution heightening circuit as claimed in claim 2, wherein said modulation information forming circuit comprises:

first, second, and third processing circuits connected to said template pattern producing circuit for processing left, middle, and right columns of said template pattern to produce first, second, and third processed value signals, respectively;

a pulse width deciding circuit connected to said second processing circuit for deciding width of the driving pulses on the basis of the second processed value signal to produce a width signal representative of the width;

a pulse position deciding circuit connected to said first and said second processing circuits for deciding position of the driving pulses on the basis of the first and the third processed value signal to produce a position signal representative of the position; and a pulse width modulation information producing circuit connected to both said pulse width deciding circuit and said pulse position deciding circuit for producing the pulse width modulation information signal in response to the width signal and the position signal.

4. A resolution heightening circuit as claimed in claim 2, wherein said modulation information forming circuit comprises:

first, second, and third processing circuits connected to said template pattern producing circuit for processing left, middle, and right columns of said template pattern to produce first, second, and third processed value signals, respectively;

a pulse width deciding circuit connected to said second processing circuit for deciding a width of the driving pulses on the basis of the second processed value signal to produce a width signal representative of the width;

a pulse position deciding circuit connected to said first and said second processing circuits for deciding position of the driving pulses on the basis of the first and the third processed value signal to produce a position signal representative of the position; and a pulse width modulation information producing circuit connected to both said pulse width deciding circuit and said pulse position deciding circuit for producing the pulse width modulation information signal in response to the width signal and the position signal.

5. A resolution heightening circuit as claimed in claim 4, wherein said pulse width deciding circuit comprises:

a plurality of pulse width setting registers for registering pulse width setting data sets different from one another, respectively; and a first selector connected to said pulse width setting registers and said second processing circuit for selecting one of said pulse width setting registers in response to the second processed value signal to supply the pulse width setting data set registered in selected one of said pulse width setting registers to said pulse width modulation information producing circuit as the width signal.

6. A resolution heightening circuit as claimed in claim 5, wherein said pulse width setting registers comprise are pulse width setting registers.

7. A resolution heightening circuit as claimed in claim 4, wherein said pulse position deciding circuit comprises:

a subtracting circuit connected to said first and said third processing circuits for subtracting a value represented by the third processed value signal from a value represented by the first processed value signal to produce a subtracted result signal;

a plurality of pulse position setting registers for registering pulse position setting data sets different from one another, respectively; and a second selector connected to said subtracting circuit and said pulse position setting registers for selecting one of said pulse position setting registers in response to the subtracted result signal to supply the pulse position setting data set registered in a selected one of said pulse position setting registers to said pulse width modulation information producing circuit as the position signal.

8. A resolution heightening circuit as claimed in claim 7, wherein said pulse position setting registers comprise six pulse position setting registers.

9. A resolution heightening circuit connected between a printing unit and a host printer control circuit, said resolution heightening circuit comprising:

a modulation information generating circuit that generates a pulse width modulation information signal based on printing data from said host printer control circuit using a template pattern of four lines by three dots; and a modulation circuit that produces modulated driving pulses based on the pulse width modulation information signal.

10. The resolution heightening circuit of claim 9, wherein said modulation information generating circuit comprises:

a line data memorizing circuit that memorizes the printing data from said host printer control circuit;

a template pattern producing circuit connected to said line data memorizing circuit that reads the printing data from said line data memorizing circuit to produce said template pattern based on the printing data; and a modulation information forming circuit connected to said template pattern producing circuit and said modulation circuit that forms the pulse width modulation information signal from the template pattern.

11. The resolution heightening circuit of claim 10, wherein said modulation information forming circuit comprises:

first, second, and third processing circuits connected to said template pattern producing circuit that processes left, middle, and right columns of said template pattern to produce first, second, and third processed value signals, respectively;

a pulse width deciding circuit connected to said second processing circuit that produces a width signal representative of the width based on the second processed value signal;

a pulse position deciding circuit connected to said first and said second processing circuits that produces a position signal representative of the position based on the first and the third processed value signal; and a pulse width modulation information producing circuit connected to both said pulse width deciding circuit and said pulse position deciding circuit for producing the pulse width modulation information signal in response to the width signal and the position signal.

12. The resolution heightening circuit of claim 11, wherein said pulse width deciding circuit comprises:

a plurality of pulse width setting registers that register different pulse width setting data sets; and a first selector connected to said pulse width setting registers and said second processing circuit that selects one of said pulse width setting registers based upon the second processed value signal to supply the pulse width setting data set registered in the selected one of said pulse width setting registers to said pulse width modulation information producing circuit as the width signal.

13. The resolution heightening circuit of claim 11, wherein said pulse position deciding circuit comprises:

a subtracting circuit connected to said first and said third processing circuits that produces a subtracted result signal by subtracting a value represented by the third processed value signal from a value represented by the first processed value signal;

a plurality of pulse position setting registers that each register a different pulse position setting data set; and a second selector connected to said subtracting circuit and said pulse position setting registers that selects one of said pulse position setting registers based upon the subtracted result signal to supply the pulse position setting data set registered in the selected one of said pulse position setting registers to said pulse width modulation information producing circuit as the position signal.

14. A resolution heightening circuit connected between a printing unit, which has a first resolution, and a host printer control circuit, which produces printing data for a second resolution greater than the first resolution, said resolution heightening circuit comprising:

a modulation information generating circuit that generates a pulse width modulation information signal based on printing data from said host printer control circuit; and a modulation circuit that produces modulated driving pulses based on the pulse width modulation information signal, wherein said modulation information generating circuit comprises one of:
a plurality of pulse width setting registers; and
a plurality of pulse position setting registers.

15. The resolution heightening circuit of claim 14, wherein said modulation information generating circuit generates said pulse width modulation information signal based on one of a pulse width signal from one of said plurality of pulse width setting registers and a pulse position signal from one of said plurality of pulse position setting registers.

16. The resolution heightening circuit of claim 14, wherein said modulation information generating circuit generates a pulse width modulation information signal using a template pattern of four lines by three dots.

17. The resolution heightening circuit of claim 14, wherein said modulation information generating circuit further comprises:

a line data memorizing circuit that memorizes the printing data;

a template pattern producing circuit connected to said line data memorizing circuit that reads the printing data from said line data memorizing circuit to produce a template pattern based on the printing data; and first, second, and third processing circuits connected to said template pattern producing circuit that processes left, middle, and right columns of said template pattern to produce first, second, and third processed value signals, respectively.

18. The resolution heightening circuit of claim 17, wherein said modulation information generating circuit further comprises a first selector connected to said plurality of pulse width setting registers and said second processing circuit that selects one of said plurality of pulse width setting registers based upon the second processed value signal to supply the pulse width setting data set registered in the selected one of said plurality of pulse width setting registers to said pulse width modulation information producing circuit as the width signal.

19. The resolution heightening circuit of claim 17, wherein said modulation information generating circuit further comprises a subtracting circuit connected to said first and said third processing circuits that produces a subtracted result signal by subtracting a value represented by the third processed value signal from a value represented by the first processed value signal.

20. The resolution heightening circuit of claim 19, wherein said modulation information generating circuit further comprises a second selector connected to said subtracting circuit and said plurality of pulse position setting registers that selects one of said plurality of pulse position setting registers based upon the subtracted result signal to supply the pulse position setting data set registered in the selected one of said plurality of pulse position setting registers to said pulse width modulation information producing circuit as the position signal.

* * * * *